US008333885B1

(12) United States Patent
Iorio

(10) Patent No.: US 8,333,885 B1
(45) Date of Patent: Dec. 18, 2012

(54) STORMWATER FILTRATION SYSTEM AND METHOD WITH PRETREATMENT CAPABILITY

(76) Inventor: Paul Anthony Iorio, Halifax, MA (US)

( * ) Notice: Subject to any disclaimer, the term of this patent is extended or adjusted under 35 U.S.C. 154(b) by 298 days.

(21) Appl. No.: 12/802,753

(22) Filed: Jun. 14, 2010

Related U.S. Application Data

(60) Provisional application No. 61/218,408, filed on Jun. 19, 2009.

(51) Int. Cl.
*C02F 3/32* (2006.01)
(52) U.S. Cl. ............... 210/150; 210/170.03; 210/170.08
(58) Field of Classification Search .................. 210/150, 210/151, 170.01, 170.03, 170.08, 602, 747.2, 210/747.3
See application file for complete search history.

(56) References Cited

U.S. PATENT DOCUMENTS

| | | | | |
|---|---|---|---|---|
| 3,770,623 | A | | 11/1973 | Seidel |
| 4,218,318 | A | * | 8/1980 | Niimi et al. ............... 210/170.01 |
| 4,839,051 | A | * | 6/1989 | Higa .............................. 210/602 |
| 5,702,593 | A | * | 12/1997 | Horsley et al. ........... 210/170.03 |
| 5,725,760 | A | | 3/1998 | Monteith |
| 5,746,911 | A | | 5/1998 | Pank |
| 6,277,274 | B1 | | 8/2001 | Coffman |
| 6,569,321 | B2 | | 5/2003 | Coffman |
| 6,783,683 | B2 | | 8/2004 | Collings |
| 6,869,528 | B2 | | 3/2005 | Pank |
| 6,905,599 | B2 | * | 6/2005 | Allard ..................... 210/170.03 |
| 7,022,243 | B2 | | 4/2006 | Bryant |
| 7,080,480 | B2 | | 7/2006 | Urban et al. |
| 7,425,261 | B2 | | 9/2008 | Siviter et al. |
| 7,625,485 | B2 | | 12/2009 | Siviter et al. |
| 7,776,217 | B2 | * | 8/2010 | Lucas ........................... 210/602 |
| 7,833,412 | B2 | * | 11/2010 | Holtz .............................. 210/150 |
| 7,967,979 | B2 | * | 6/2011 | Grewal et al. ................. 210/150 |
| 8,110,105 | B2 | * | 2/2012 | Allen et al. ............. 210/170.03 |
| 2008/0142438 | A1 | * | 6/2008 | Kent ............................. 210/151 |
| 2008/0251448 | A1 | * | 10/2008 | Kent ............................. 210/150 |
| 2011/0147303 | A1 | * | 6/2011 | Allard ..................... 210/170.03 |
| 2011/0186492 | A1 | * | 8/2011 | Holtz ....................... 210/170.03 |

* cited by examiner

*Primary Examiner* — Christopher Upton
(74) *Attorney, Agent, or Firm* — Salter & Michaelson

(57) ABSTRACT

A stormwater treatment system and method for removing sediment, chemical pollutants, and debris from stormwater runoff by utilizing bioretention practices including physical, chemical and biological processes by passing stormwater runoff water through a multi-phase filtering and treatment train. Stormwater is initially directed to and enters a pretreatment collection chamber located within or exterior of a primarily open-bottomed, multi-dimensional container whereby entrained sediment and other transportable materials are captured and collected prior to continued transport, filtration and treatment through a media filter layer. A live plant (preferably a tree) situated within the container with roots resident in the media filter layer with the ability for expansion beyond the perimeter of the container through openings in one or more sidewalls. The treated water may be further conveyed to a separate compartment or storage area for additional filtration and temporary collection and storage, or discharged exterior of the container. A vertically positioned overflow/bypass piping apparatus may be included within the stormwater treatment system to provide additional water conveyance. Additional ancillary filtration and storage facilities may be connected to the described stormwater treatment system as conditions warrant.

22 Claims, 4 Drawing Sheets

FIG. 3a
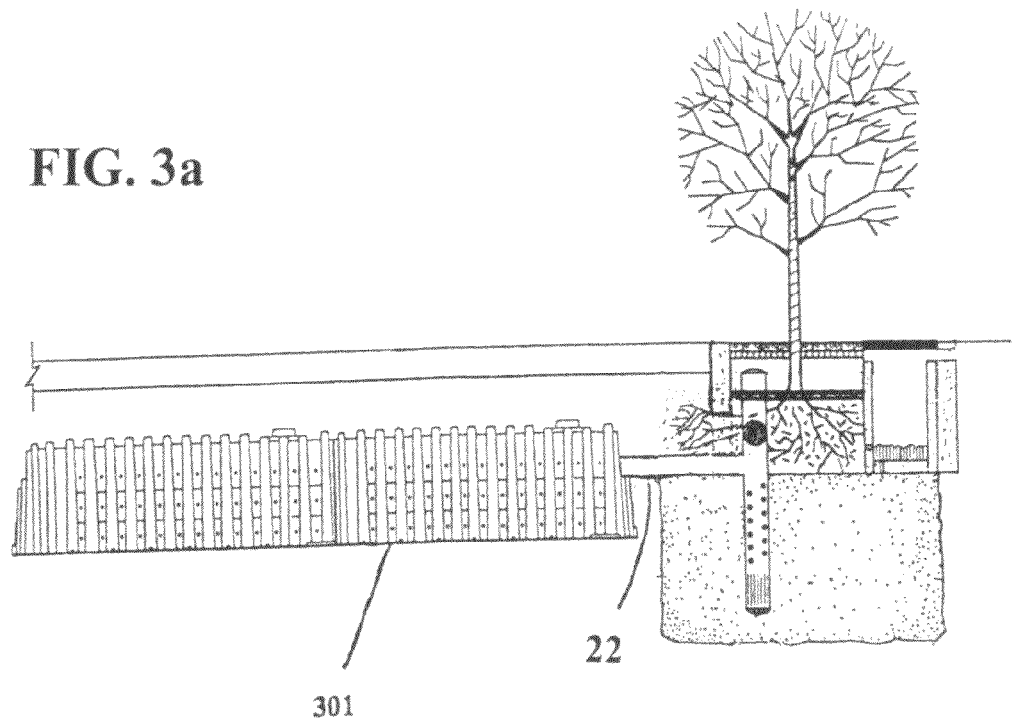
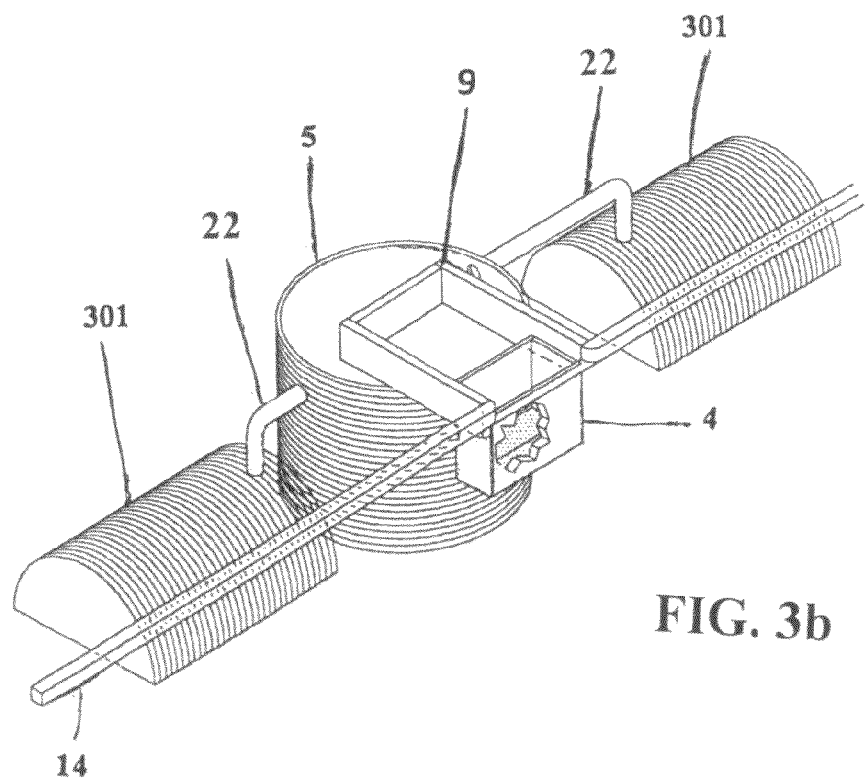
FIG. 3b

STORMWATER FILTRATION SYSTEM AND METHOD WITH PRETREATMENT CAPABILITY

CROSS-REFERENCE TO RELATED APPLICATIONS

This application claims the benefit of provisional patent application No. 61/218,408, titled "Bioretention Stormwater Management System" filed Jun. 19, 2009 by the present inventor.

FEDERALLY SPONSORED RESEARCH

Not Applicable

SEQUENCE LISTING OR PROGRAM

Not Applicable

BACKGROUND

1. Field

The application relates to a filtration system, method, and device to manage and improve the quality of stormwater runoff by removing and remediating pollutant constituents entrained in the water by way of physical, chemical, and biological processes. The invention is intended to collect and process stormwater emanating from paved and unpaved surfaces, as well as from building roof drain structures.

2. Prior Art

Stormwater runoff transports varying quantities of pollutants such as oil/grease, phosphorous, nitrogen, bacteria, heavy metals, pesticides, sediments, and other inorganic and organic constituents with the potential to impair surficial water bodies, infiltrate groundwater, and impact aquifer systems. The systemic sources of these pollutants are referred to as either 'point' or 'nonpoint' (sources). Point source pollution is typically associated with a release such as a spill from a chemical plant, or soapy water from a car washing, or excess fertilizer runoff from a residential lawn. These are considered single or near source releases that can be tracked to an "upstream" event or ongoing condition. Nonpoint source pollution is not readily discernable with respect to a single source or condition, but is associated with combined pollutant loading and deposition from many ubiquitous sources spread out over a large area including a variety of human activities on land, vehicle emissions (e.g., oil, grease, antifreeze), vehicle material wear (e.g., brake pads, metal on metal rubbing, corrosion), as well as natural characteristics of the soil and erosion, climate, and topography. Sediment transport is the most common form of nonpoint source pollution as it can contain a myriad of soluble and insoluble pollutants, comingled and concentrated and easily transported over impervious and pervious surfaces. Nonpoint source (stormwater) pollution is considered to be the primary contributing factor in contributing to water degradation. Over the past three decades, many studies have been performed to identify the major pollutant constituents typically found in stormwater, and relative concentrations found in both urban and suburban runoff. Studies consistently concluded that pollutant levels, particularly in urban runoff, contain deleterious concentrations of pollutants with the potential to significantly impact receiving waters such as streams, lakes, rivers, as well as our underground groundwater aquifer system.

Pollutants in both soluble and insoluble forms such as nitrogen, phosphorous, zinc, copper, petroleum hydrocarbons, and pesticides at various concentrations are commonly found in the stormwater profile. These constituents maintain varying degrees of solubility and transport with some being more mobile than others. Some constituents have a chemical affinity to "sorb" (adsorb/absorb) and collect, or, "hitch a ride," onto sand particles, sediment, or other non-aqueous matter entrained in the stormwater during transport, thereby increasing the mass of concentration. Sediment laden pollution can also impair waterways due to increased levels of turbidity thereby decreasing sunlight penetration within water bodies, and impairing aquatic life.

Historically, nonpoint source pollution stormwater management systems have relied on collection and conveyance via a network of catchments and underground piping that typically transferred and discharged stormwater to a downgradient water body. Over the past several decades, the practice of stormwater detention and/or retention which relies on the collection or transfer of stormwater to surficial ponds or holding areas whereby infiltration, and to smaller degree evaporation, were the mechanisms for removal. Both of these management techniques are commonly referred to as "centralized" or "end of pipe" techniques.

Beginning in the early 1980's, academia, municipalities, state and federal environmental regulatory agencies began looking at ways to best mitigate problems associated with nonpoint source pollution and stormwater runoff. Instead of relying solely on centralized stormwater collection and conveyance, a more "decentralized" approach to stormwater management began to evolve. Such traditional physical factors in determining stormwater control practices such as site topography, soil percolation rates, and degree of impervious cover were integrated with strategic land planning in an attempt to best replicate pre-development conditions and preserve the natural process of direct subsurface infiltration of precipitation. The focus turned to ways in which innovative engineering, systems design, and construction practices in new development and redevelopment could best be employed to reduce the impact from increasing the impervious "footprint" and minimize site impact. The term "best management practices" (BMPs) was used to collectively identify various stormwater control practices and methodologies to achieve decentralized versus centralized management and treating water at its source instead of at the end of the pipe.

Low impact development (LID) is a term used to describe a land planning, engineering, and building design approach to managing stormwater runoff. LID emphasizes conservation and use of on-site natural features to protect water quality. This approach implements engineered small-scale hydrologic controls to replicate or mimic the pre-development hydrologic regime of watersheds through infiltrating, filtering, storing, evaporating, and detaining runoff close to its source. A concept that began in Prince George's County, Maryland in approximately 1990, LID began as an alternative to traditional control measures. Officials found that traditional practices of detention and retention maintenance were not cost-effective, and in many cases, the results did not meet water quality goals.

Today, LID storm water management systems have shown to reduce development costs through the reduction or elimination of conventional storm water conveyance and collection systems. Furthermore, LID systems typically reduce the need for paving, curb and gutter fixtures, piping, inlet structures, and storm water ponds by treating water at its source instead of at the end of the pipe. Although up-front costs for LID practices are generally higher than traditional controls, developers often recoup these expenditures in the form of enhanced community marketability, and higher lot yields.

Developers are not the only parties to benefit from the use of LID storm water management techniques, municipalities also benefit in the long term through reduced maintenance costs.

Of particular interest in regard to the present invention is a BMP practice based on the principals of "bioretention." Bioretention is typically defined as the filtering of stormwater runoff through a plant/soil/microbe complex to capture, remove, and cycle pollutants by a variety of physical, chemical, and biological processes. Bioretention is a practice that relies on gravity to allow stormwater to infiltrate natural or engineered media complexes while providing some degree of sediment collection/separation, and encouraging microbial degradation of entrained pollutants. Such bioretention practices as "rain gardens" and "sand filters" began to be incorporated as part of LID practices beginning in the 1990's. The ability and rate of hydraulic transport is essentially unencumbered by structural components or barriers whether introduced or previously existing, but more a feature of geologic composition. Although sand filters provide some degree of bioretention efficacy, more importantly, rain gardens rely on plant systems to further enhance microbial activity, and assimilate and uptake pollutant constituents such as phosphorous, nitrogen, and zinc in their soluble form. Accumulated test data of pollutant removal rates by bioretention practices has consistency shown high levels of remediation.

Both practices rely on "direct infiltration" as a primary mechanism to achieve stormwater transport as well as pollutant removal efficiencies. Direct infiltration allows for the vertical movement of water through gravity or hydraulic head. Most federal and state environmental protection agencies recognize direct infiltration as the preferred means for returning rainwater runoff to the natural aquifer system as opposed to piping collected stormwater to a downgradient water body location potentially miles away such as a river, lake, or the ocean.

Within the past decade, another BMP practice/system which relies on infiltration and bioretention to achieve pollutant removal goals has emerged. This system typically integrates a landscape tree with stormwater collection and remediation. The system is commonly referred to as a "tree box filter" system. The University of New Hampshire Stormwater Center (UNHSC) was one of the earliest institutions to construct and test a tree box filter system. In 2007, the UNHSC installed a tree box filter system at their campus test center. The system as designed was an approximately six-foot diameter, three-foot deep, round concrete vault resembling a large inverted concrete pipe. It was filled with a bioretention soil mix composed of approximately 80 percent sand and 20 percent compost. It was underlain horizontally by a perforated "sub drain" pipe at the base of the vault that was connected to, and discharged infiltrated stormwater to an existing stormwater drainage system.

The system also contained an open-topped, vertical bypass pipe near the surface to accommodate heavy stormwater events which would otherwise overwhelm the concrete vault. The vault was open-bottomed to provide some direct infiltration to the underlying soils. The filter media was approximately three feet deep and was designed to maximize permeability while providing organic content by the incorporation of compost and native soils to sustain the tree. The vault was designed to be integrated with a street curb opening to collect surface runoff. During a rain event, stormwater migrating along a street curb would enter the curb cut opening and the vault system. The water then infiltrated through the media and was primarily conveyed through the sub drain pipe to the existing stormwater drainage system. Although the device had the capability of infiltrating stormwater to the surrounding environment through the open bottom, it principally relied on the sub drain pipe to convey stormwater to the (existing) separate drainage system.

Most recently, several proprietary tree box filter systems have been introduced for commercial use and are currently marketed as a stormwater treatment device for the collection, filtration, and discharge of (treated) stormwater emanating from paved surfaces. As with the previously described UNHSC system, these systems are primarily vault systems with enclosed sides. They typically are constructed as a water impermeable precast concrete container with four side walls with a perforated horizontal underlain (drain) pipe located at the base of the container. However, in contrast to the aforementioned UNHSC design system, these proprietary systems, typically have a water impermeable bottom wall essentially forming a five-sided box, with a partially open top to allow for plant growth. They are designed to be integrated with street curbside collection with stormwater entering the system via an opening (throat) at the top of the container. The container contains an (engineered) soil filter media of specific composition, with an overlying organic mulch media layer. The drain pipe collects and conveys filtered stormwater to an outlet point exterior of the container that is typically connected to a downgradient catchbasin or other existing stormwater drainage system structure. The drain pipe is typically embedded in gravel and pea stone to facilitate collection and transport of all infiltrating water to the outlet point. The horizontal and vertical dimensions, and capacity of these layers, are defined by the confining dimensions of the container. Plant material (typically a tree) is resident in the container with root growth confined within the container. These systems are designed to collect and infiltrate surficial stormwater runoff as well as roof or structural runoff. Based on third party evaluation and testing data, these tree box filter systems have proven to provide effective stormwater quality treatment with the capacity to provide substantial pollutant removal rates.

Although tree box filters have proven to be an effective pollutant removal technology, several perceived deficiencies to their long term efficacy, and inability to provide direct infiltration, have been identified, which are the inspiration and basis of the present invention.

Since tree box filter systems are inherently closed systems, both the filter media and plant root systems are contained within a five-sided box, therefore, their identifying name. Not unlike a "pot bound" potted plant, the roots of the plant (particularly trees) within a tree box filter are confined and restricted from normally developing and freely migrating beyond the walls of the container. It is common knowledge that the majority of tree root growth is in a horizontal versus vertical direction. Roots primarily grow and spread laterally outward, and away from the main trunk in search of nourishment to include water, nutrients and oxygen. Based on documented studies and an accepted understanding of tree root growth by the arboriculture and horticulture community, as well as an evaluation of tree root systems following disturbance or "wind throw", over 80% of a mature tree's root system typically resides in the top 12 inches of soil. Therefore, a tree's root mass exists, and growth takes place, within a shallow horizontal matrix. It is also understood that a tree's roots normally grow to and beyond the distance of its canopy, or outer perimeter of leaf growth, typically by a factor of two or three times the distance between the trunk and outer edge of the canopy. Therefore, a healthy and thriving tree would require an extensive horizontal range to develop properly.

A majority of commercial proprietary tree box system containers encompass less than 40 square feet in horizontal dimension. Due to the aforementioned discussion of root growth requirements, an actively growing containerized tree, as typified by a tree box system, would be expected to "out grow" its horizontal dimension prior to attaining maturity. The negative consequences from the exhaustion of growing area, and the adverse effects of restricting a tree's root system from expanding normally, could be the stunting of growth, decline in health, and potential susceptibility to disease and insect infestation. Furthermore, actively growing roots will be deflected in opposing directions following contact with an impenetrable obstacle such as the wall(s) of a tree box container. These roots have the potential to encircle the tree's trunk causing a common condition called "girdling" whereby the encircling roots can strangle the trunk as well as other developing roots and choke off nourishment. These debilitating factors could potentially lead to the premature death of the tree.

If the tree in a tree box system requires removal and replacement due to decline or premature death, significant labor and material costs would be incurred. To facilitate tree removal, presumably most, if not all of the media within the container would also require removal. This associated cost and labor burden could further be exacerbated due to the potential need to remove existing gravel or pea stone surrounding the aforementioned underlain piping at the base of the container of the typical tree box filter system.

Another perceived deficiency due to the effect of the "consumption" of media space by the ever increasing mass of root growth within the confined space of a tree box system, would be the eventual reduction of stormwater movement and infiltration through the media filter. Most commercial tree box filter systems depend on rapid stormwater infiltration through the media to achieve treatment goals. The typical tree box filter media is purposely engineered to be of a highly porous open structure composition, primarily consisting of larger particle gravelly sands, thus providing rapid infiltration, as opposed to common landscape or garden soils that typically contain finer particles of sands, silts, and clay that inhibit rapid infiltration. A lesser percentage of the media mix is typically made up of these latter constituents as well as peat moss or compost that have the ability to absorb and retain water. These constituents are critical in providing irrigation for the tree and to sustain root growth, as well as promoting microbial growth for the degradation of some pollutants. However, it is apparent that the ever expanding network of roots of a maturing tree confined within a tree box would be expected over time, to interfere with and slow down the rapid infiltration of stormwater, thus reducing operational efficiency of the system.

An additional perceived deficiency with a conventional commercial tree box filter system is that since these systems are primarily closed bottomed, the only means to discharge infiltrated stormwater outside of the tree box is by way of the underlain drain pipe. Since this pipe is typically connected to a downgradient catchbasin, or other closed stormwater management system, there is little opportunity to directly infiltrate quantities of this filtered water to surrounding soils and the groundwater system. As previously explained, direct infiltration to surrounding soils is the preferred mode for returning rain water, in the form of treated stormwater, to the aquifer system. Therefore, an open bottomed tree filter system would allow quantities of filtered stormwater to be returned to surrounding subsurface soils and ultimately the groundwater and aquifer system. Additionally, commercial tree box filter systems typically utilize a four or six inch diameter drain pipe as the sole means to discharge filtered water from the system box. The quantity of water, and speed for which water could be evacuated from the box, are therefore severely limited due to the use of a small diameter outlet pipe as opposed to an open bottomed system such as the present invention.

Conventional tree box filter systems do not typically possess a separate or stand-alone "pretreatment" device (e.g., container, chamber) to collect, segregate and/or contain sands, sediment, and other (non aqueous materials) typically entrained in the stormwater runoff. As previously discussed, pollutants in both soluble and insoluble forms are commonly found in the stormwater profile. Some constituents have a chemical affinity to sorb and collect to fine particles or sediment entrained in the stormwater during transport thereby increasing the mass of concentration. As stormwater travels along a paved surface, depending on its volume and force, it dislodges, entrains, and transports quantities of sands, sediments or other non aqueous materials in its path of flow. As the stormwater enters the tree box system through the curbside throat opening, depending on the constituents and the (particle) size of this material, much of it tends to collect on the mulch layer overlying the filter media. Over time, this material typically accumulates on the mulch surface and interferes with and restricts the normal rapid media filtration process. Additionally, stormwater contains finer sands and sediment material, both visible and non visible, within its flow. Due to their smaller particle size, some of these materials are able to pass through the mulch layer and may become entrapped in the underlying engineered media layer, also interfering with and restricting the normal filtration process.

Although some degree of non aqueous material would invariably pass through a pretreatment control, due to the quantity of stormwater passing through a tree box system, a pretreatment device would serve to restrict a large portion of this material from potentially clogging the system. Since a pretreatment device or "chamber" would contain much of this non aqueous material prior to entering the media filter, it would not only maintain the efficacy of a tree filtering system, but also provide ease of maintenance. Without pretreatment material containment, maintenance of a tree box filter system consists of the removal of accumulated trash, sands and sediment as well as the underlying mulch layer incurring both significant labor costs to remove the comingled material, as well as additional material waste (i.e., mulch).

Commercial tree box filter systems are currently being used in many parts of the country in both commercial and residential applications where a stormwater management system is essential to mitigate non-point source pollution. These systems are typically manufactured of precast concrete by concrete manufacturers or their affiliates. They are customarily delivered pre-filled with filter media and arrive at a site ready for installation and the incorporation of the final plant product. The primary intent of a closed box system design prefilled with media is to be one of a "packaged" and "drop in place" product, uniform in construction, thereby expediting installation and reducing handling time and associated costs. Essentially closed-bottomed and closed-sided pre-cast concrete water impermeable treatment containers without a separate or stand-alone pretreatment chamber are described in U.S. Pat. Nos. 6,277,274 and 6,569,321.

Several advantages to the present invention as to be detailed in the following description are designed to rectify the perceived deficiencies in current tree box filter systems. Some of these advantages include unrestricted plant and root growth, a separate pretreatment facility, an open bottomed design to allow for direct infiltration, and a collection compartment of various sizing and configuration options. These and other advantages will become apparent from a consideration of the following description and accompanying drawings.

SUMMARY

The present invention is intended to be a stormwater treatment system with bioretention functionality and is designed to treat stormwater runoff emanating from either pervious or impervious surfaces (e.g., streets, parking lots, grassed areas, roof tops). An embodiment consists of a primarily open-bottomed container with a top at least partially open to the atmosphere, and side walls of varying vertical dimension. The container contains a filter media consisting of a mixture of organic and non-organic materials, with an overlying layer of an organic or nonorganic mulch material. Portions of the filter media on one or more sides of the container may maintain contact or otherwise communicate with the surrounding native or existing soil. Plant material will be located within the container with vegetative growth emanating through a central opening in the top portion of the container, with at least partial, or free expression of the attended root system beyond the exterior "footprint" of the container.

Within the container, either fixed or unattached, is a separate open-topped pretreatment chamber with sidewalls of varying height(s), with the purpose to contain or maintain incoming sand, sediment, and other floatable or non floatable matter entrained within the stormwater flow.

This and other embodiments and features of the present invention will become apparent from the following detailed description, accompanying illustrative drawings, and appended claims.

BRIEF DESCRIPTION OF THE DRAWINGS

FIGS. 3(a), 3(b) is a cutaway cross-sectional view, and a partial cutaway perspective view of a second embodiment of the invention in conjunction with a separate collection facility exclusive of the invention and of unique design and manufacture by others.

These renderings are included for illustrative and interpretive purposes relative to specific embodiments and applications and should not be construed as the sole positioning, configurations, or singular use of the present invention.

DESCRIPTION OF PREFERRED EMBODIMENTS

Figure 1:
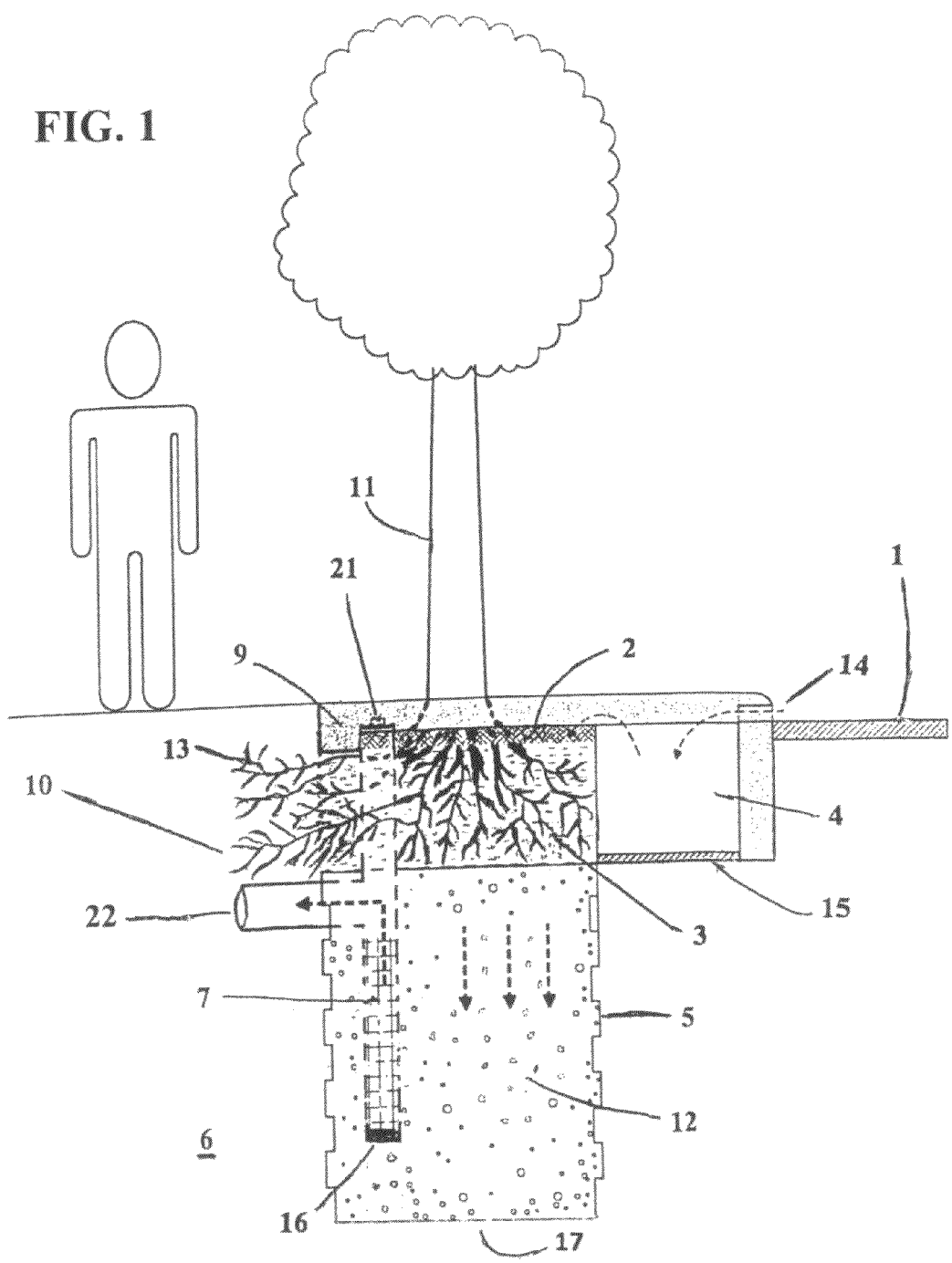
FIG. 1 is a cutaway cross-sectional view of various aspects of a stormwater treatment system of the present invention including a pretreatment chamber, multi-sided container, and subsurface compartment.

The present invention is designed to be a stormwater runoff treatment system whereby mixed debris, sands, sediment, entrained and dissolved chemical and biological pollutants are separated, treated and/or remediated via physical, chemical, and biological processes prior to being directly infiltrated to the subsurface environment, and/or discharged to a separate drainage system. Referring now to FIG. 1, the stormwater runoff treatment system consists of three perceived stages of remedial operation: 1) The first stage consists of a pretreatment collection chamber 4; 2) The second stage consists of a substantially water impermeable container 9, containing a mulch layer 2, and an underlying filter media layer 3, which maintains a vegetative plant(s) 11 whose roots 13 are resident in the filter media layer, and are able to horizontally communicate unrestricted with the surrounding existing (native) soils 10; 3) the third stage consists of an open bottomed collection compartment or restrictive liner 5 of multi-dimensional geometric configuration consisting of partially permeable or essentially impermeable vertical sides that surround or substantially contain an aggregate material 12. The purpose of these three stages are to provide a high degree of pollutant removal efficacy prior to direct infiltration to the surrounding subsurface environment, or discharging to another stormwater management system.

Figure 2:
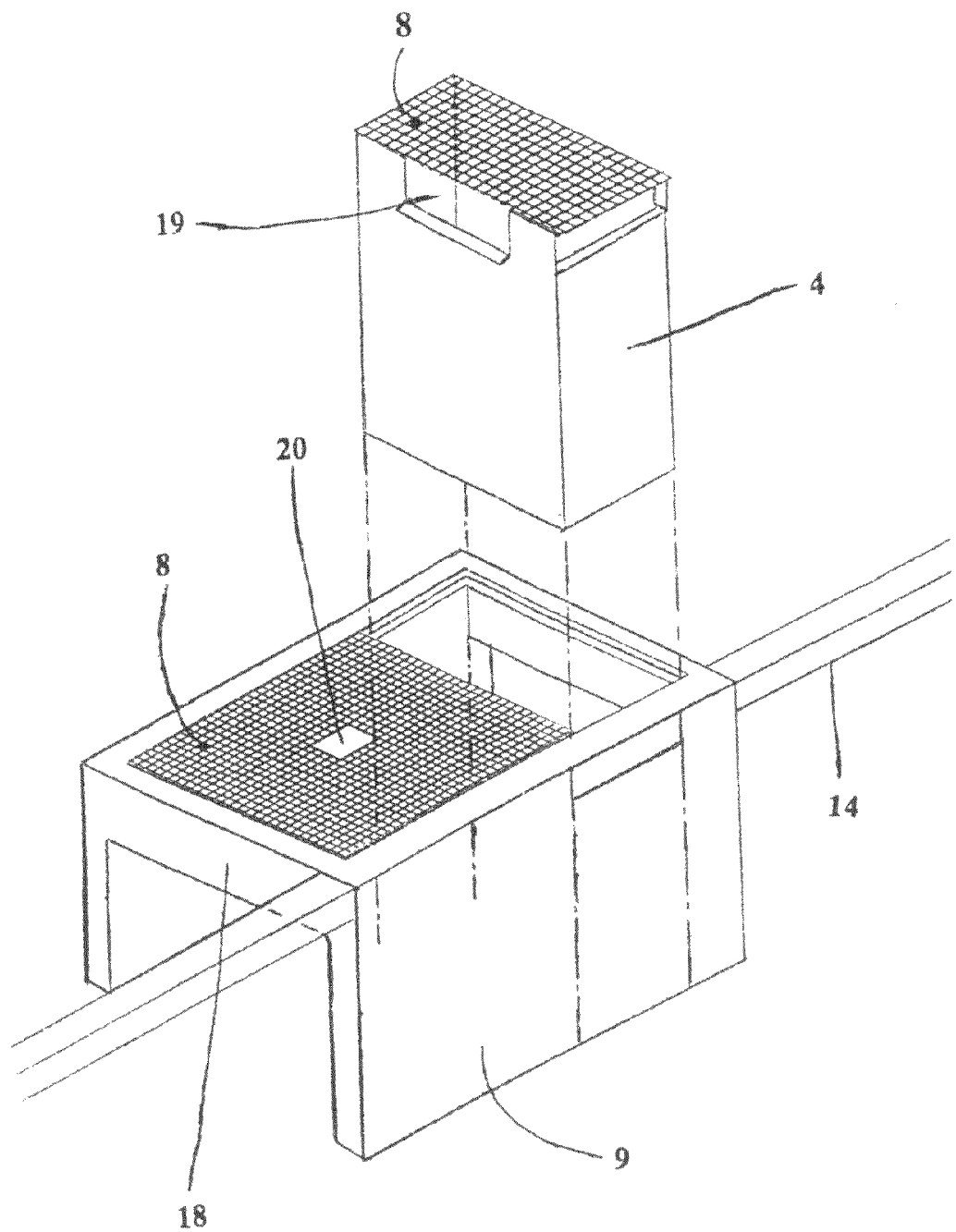
FIG. 2 is a cutaway perspective view of an embodiment in a "streetscape" application to treat roadway stormwater runoff.

While continuing to reference FIG. 1, and also FIG. 2, the following description includes the preferred embodiment, manner of operation, and pollutant removal function(s). Stormwater enters the substantially water impermeable open-bottomed container 9 through one or more openings located on the container's sidewall, or an opening in a curb 14, along a street 1, or through an inlet structure, or pipe opening. The preferred embodiment of the container is of a water tight concrete, steel, or polymer plastic (or other impermeable substance) fabrication. The configuration, horizontal dimensions and shape of this container is primarily determined based on site logistics, and the size of the appropriate media layer to accommodate the flow emanating from the contribution area that makes up the watershed. The container has a top at least partially open to the atmosphere, and side wall(s) of varying vertical dimension, with at least one 18, being partially or primarily open to the surrounding environment. The preferred areal "footprint" of the container is between 24 and 42 square feet.

Incoming stormwater flows immediately into the pretreatment chamber 4 within the container. The preferred embodiment of this chamber is an essentially water tight steel, concrete, polymer plastic, or other substantially fabricated material, of varying horizontal and vertical dimension, but typically between two and four feet in depth, with one or more sidewalls being of dissimilar height, or with an opening 19. The chamber is either fixed to the interior wall of the container, or unattached. Quantities of sand, sediment, and other floatable or non floatable matter entrained within the stormwater flow also enters the chamber and some of this entrained material is deposited into, then collects and accumulates within the chamber 15. As water continues to flow into the chamber, the water level rises, and then flows through an opening, or over the top of one or more of the side walls of the chamber. By gravity, the water is then directed onto the layer of mulch which may consist of organic or inorganic matter, and/or a fabricated geotextile material 2, preferably between two and four inches in depth. The areal dimension of this layer typically conforms to the inside dimensions of the container.

Additional quantities of sand, sediment and other floatable or non floatable matter flowing out of the chamber may be deposited and/or entangled within this layer. As the water infiltrates through the mulch layer, it then contacts the underlying layer of filter media 3 of a varying horizontal dimension, but not restricted by the areal dimension of the container; preferably between 12 and 30 inches in depth. The filter media layer is comprised of a mixture of aggregates (e.g., sand, gravel, stone), and organics, to achieve a substantial rate of infiltration, while maintaining moisture holding capacity to maintain biological activity and support plant growth.

The water infiltrates through and then exits the engineered media layer of the container. The infiltrating water than typically communicates with the underlying, primarily open-bottomed compartment 5 consisting of partially permeable or essentially impermeable vertical sides. The preferred embodiment of this compartment is of flexible polymer plastic material construction impermeable to horizontal water movement. A second embodiment would be of a fabricated geotextile material of varying size and geometric shape which could allow water to permeate through the sides. In either embodiment, water would be allowed to primarily infiltrate through the base 17 of the compartment to existing soils 6. The compartment is envisioned to contain an aggregate material (e.g., stone, gravel, sand) 12, and serve the purpose of accepting and temporarily storing water emanating from the overlying container and media layers. It is also envisioned to provide additional filtration and/or collection of sands and sediment prior to water infiltration to the surrounding soils.

Contained within the container as part of the second stage of remedial operation, is an upright growing plant, preferably a tree 11. Of particular importance is the ability of the roots 13 which are resident within the container, to extend, unrestricted, beyond at least one of the side walls 18 of the container. The trunk of the plant would extend up through the partially open top of the container. A fiberglass or metal-based fabricated grate or plate 8 may enclose portions of the open top of the container, and also the pretreatment chamber. An opening 20 within the grate would allow the plant's trunk to extend through unrestricted. The grate may be fixed or secured to the top of the container by way of fastening devices or other appurtenances.

An additional embodiment of this stormwater treatment system may include an overflow/bypass function primarily consisting of a vertically positioned piping assembly 7 of varying diameter and length to include a combination of solid wall impermeable piping and permeable (e.g., perforated, slotted sieve) piping, fabricated of a plastic polymer or metal-based material. The piping assembly would be positioned so as to traverse the engineered media component and/or aggregate-filled compartment. The purpose and functionality of this vertical piping assembly would be to primarily collect accumulated water from within the compartment and convey this water exterior of same in a horizontal direction via an (bypass/overflow) pipe 22 with or without a fitting (e.g., elbow, "T"). The top portion of the piping assembly of this feature may have a cover 21 and be closed to the environment. Alternatively, the top portion of the piping assembly may be substantially open to the environment, by way of a screening apparatus which would typically extend above the existing media/mulch layer within the container. This alternative application is envisioned to collect and convey "ponding" water that may have accumulated on the mulch/media surface due to a prolonged or flash stormwater event that would have otherwise infiltrated through both the container and compartment, and discharge exterior of the system. An additional component may include a sediment collection vessel 16 at the base of the piping assembly system. The intention of this vessel would be to store sediment entering the piping system from water migrating through or circulating within the compartment.

FIGS. 3a and 3b depict another embodiment which incorporates the present invention integrated with a separate stormwater management facility designed or manufactured by others. In this embodiment, the bypass/overflow pipe 22 emanating from the invention is connected to or otherwise directs effluent water to a separate stormwater facility 301 The separate facility may be manufactured of concrete, steel, polymer plastic, or other fabricated materials, or engineered and composed of a natural aggregate material such as stone, sand, or gravel. It is envisioned that one or more of these separate facilities, singularly, or in tandem may be connected to or aligned with the invention. Additionally, one or more of these facilities may be interconnected and reside within the intervening space between two or more of the inventions. Those skilled in the art may envision numerous incarnations, modifications and changes; therefore it is not the intent to limit this embodiment to the exact construction and operation as depicted or described.

Figure 4A:
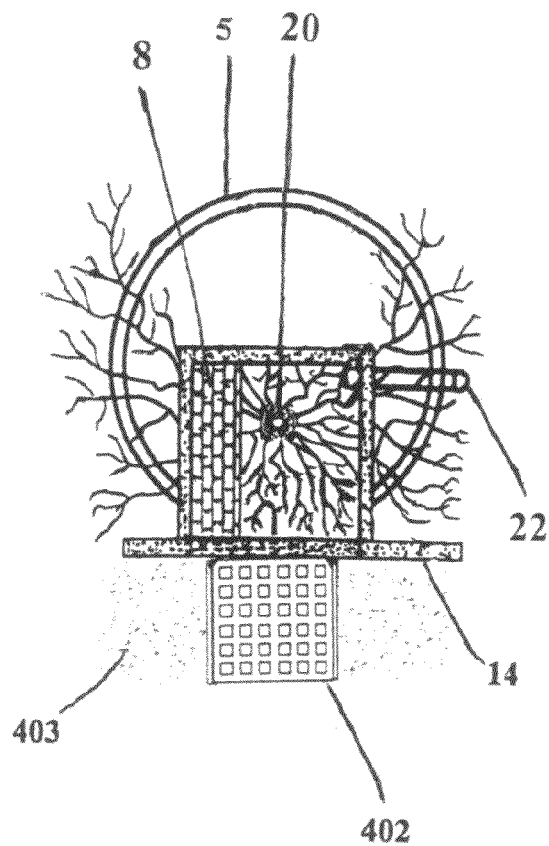
FIGS. 4(a), 4(b) is a section view, and a plan view of a third embodiment of the invention with the placement of the pretreatment collection chamber outside (exterior) of the container, but with direct communication with the container.
Figure 4B:
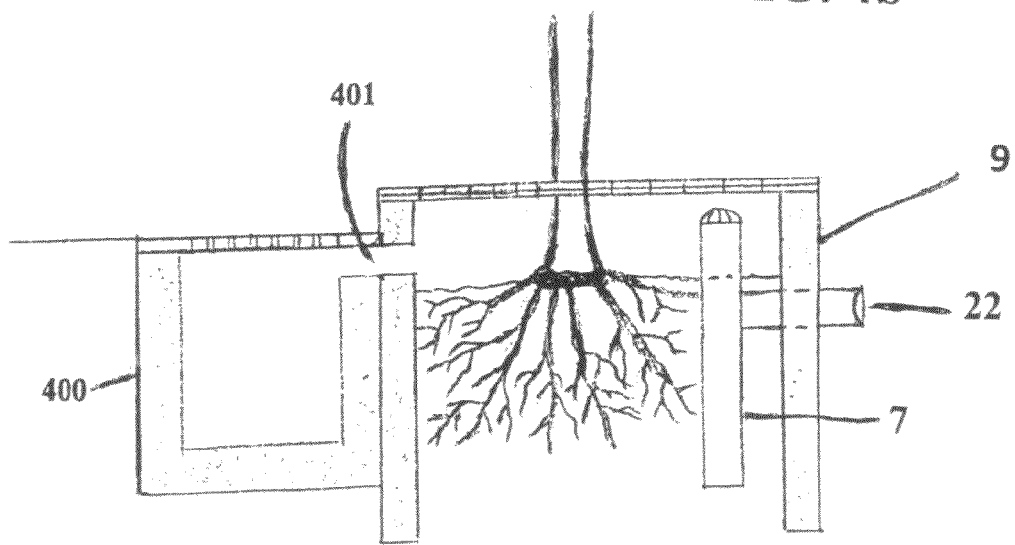

FIGS. 4a and 4b depict another embodiment which locates a pretreatment inlet structure 400, composed of concrete or steel, or a combination thereof, exterior of the container 9, either fixed or unattached, instead of a pretreatment chamber within the container as with the embodiment identified in FIG. 1. It is important to note that the exterior-positioned inlet structure essentially serves the same functional purpose as the interior-positioned facility in that it is able to capture and accumulate sand, sediment, and other non floatable materials, and communicate with, and direct and transfer stormwater to the container. It is envisioned that the transfer of water from the inlet structure to the container would occur by way of piping, fabricated flume, scupper, chute, or other conveyance measure. In this configuration, an opening in a street curb 14 may not be required to convey stormwater to the invention. The preferred stormwater inlet point would be a partially open metal or fiberglass grate 402 that would cover the inlet structure and be located at horizontal grade with a pervious or impervious surface 403, and positioned to freely accept stormwater flow emanating from same. The inlet structure would typically be closed-bottomed, between two and four feet in depth, and have the capacity to collect and store sand, sediment and other debris entrained in the incoming stormwater flow. As water enters the pretreatment inlet structure, it would rise and reach an elevation consistent with a point of transference 401 to the container by way of one of the aforementioned conveyances or appurtenances. The water would then infiltrate through the container as discussed in the embodiment identified in FIG. 1.

The foregoing descriptions and drawings should be assumed as illustrative only of the principles of the invention. The invention may be configured in a variety of shapes and sizes and is not limited by the aforementioned dimensions, construction and operation of the identified parts, materials or embodiments. It is understood that numerous modifications, changes, and substitutions of the invention will readily occur to those skilled in the art and may be resorted to falling within the scope and spirit of the invention.

CONCLUSION, RAMIFICATIONS, AND SCOPE

Accordingly, the reader, and one skilled in the art, should see the many distinguishing features and advantages held by the present invention in comparison to previous art, including conventional commercial tree box filter systems. These distinguishing features and advantages are put forth to rectify the perceived deficiencies in current tree box filter systems and provide a sustainable stormwater management solution. The present invention and associated embodiments provide the following benefits in that:

by way of the primarily open bottom design of the container and the embodiment that includes an underlying compartment, the stormwater management system provides for the direct infiltration of filtered stormwater to the surrounding environment;

by way of one or more open sides on the container, the roots of a resident plant (tree) are allowed to freely expand beyond the footprint of the container without restriction or confinement permitting the tree to grow and mature naturally with less likelihood of premature death;

by way of a separate pretreatment facility, quantities of entrained trash, sands, and sediments in the stormwater flow are captured and contained and prevented from accumulating on the filter media and restricting infiltration;

by way of a separate pretreatment facility, maintenance is more efficient and less labor intensive;

by way of multiple configurations, the stormwater management system provides for more adaptation to sites hampered by land use design constraints While the previous description contains many specifics, these should not be construed as limitations on the scope of the invention, but as exemplifications of the presently preferred embodiments thereof. Thus the scope of the invention should be determined by the appended claims and their legal equivalents. It is not desired to be limited to the exact details of construction shown and described for obvious modifications will occur to a person skilled in the art, without departing from the spirit and scope of the appended claims.

I claim:

1. A stormwater treatment system for removing substances flowing into the system comprised of a treatment container of predetermined shape having a side wall, a primarily open bottom wall, and at least a partially open top with an interior containing a filter media that fills a substantial portion of said container, whereby a partially open side wall allows said filter media to directly communicate with a subsurface area exterior of the container with plant material resident within said container capable of growing out through the top of said container wherein said container is positionable below ground level surface, a separate collection chamber either fixed to or unattached from an interior portion of said container to receive stormwater initially flowing into said treatment system prior to transference to said container, a primarily open bottomed compartment resident below said container either attached to or separate of said container but in communication with said container containing an organic or nonorganic aggregate material, a drain pipe a portion of which maintains a plurality of holes to receive treated stormwater and so positioned to traverse portions of said system interior, and an outlet pipe communicating with said drain pipe.

2. The stormwater treatment system of claim 1 wherein said drain pipe is one of vertically and horizontally positioned.

3. The stormwater treatment system of claim 1 wherein the compartment is constructed of a plastic or polymer-based material which is substantially impermeable to water flow.

4. The stormwater treatment system of claim 1 wherein the collection chamber is constructed of a woven or non-woven plastic or polymer-based material which is substantially permeable to water flow.

5. The stormwater treatment system of claim 1 wherein the compartment contains an organic or nonorganic aggregate material.

6. The stormwater treatment system of claim 1 wherein said separate collection chamber is positioned and located exterior of said treatment container while maintaining communication with said treatment container.

7. The stormwater treatment system of claim 1 wherein said outlet pipe is attached to a vertically positioned drain pipe to receive treated stormwater and communicates with a separate stormwater management facility.

8. The stormwater treatment system of claim 1 wherein said outlet pipe is attached to a vertically positioned drain pipe to receive treated stormwater.

9. A stormwater treatment system for removing substances flowing into the system comprised of a treatment container having a side wall, a primarily open bottom wall, and at least a partially open top with an interior containing a filter material, whereby a partially open side wall allows said filter media to directly communicate with a subsurface area exterior of the container with plant material resident within said container capable of growing out through the top of said container wherein said container is positionable below ground level surface, a separate collection chamber to receive stormwater initially flowing into said treatment system prior to transference to said container, a primarily open bottomed compartment resident below said container but in communication with said container containing an organic or nonorganic aggregate material, and an outlet overflow pipe coupled from said compartment.

10. The stormwater treatment system of claim 9 wherein said separate collection chamber is positioned and located exterior of said container while maintaining communication with said container.

11. A stormwater treatment system for removing substances flowing into the system comprised of a treatment container of predetermined shape having a side wall, a primarily open bottom wall, and at least a partially open top with an interior containing filter material whereby a partially open side wall allows said filter media to directly communicate with a subsurface area exterior of the container with plant material resident within said container capable of growing out through the top of said container wherein said container is positionable below ground level surface, a separate collection chamber either fixed to or unattached from the interior portion of said container to receive stormwater initially flowing into said treatment system prior to transference to said container.

12. A stormwater treatment system for removing substances flowing into the system comprised of a treatment container having at least one side wall, a primarily open bottom wall, and at least partially open top and defining an interior containing a filter material that fills a substantial portion of said container, wherein the at least one side wall has an opening that allows filtered water to communicate with a subsurface area exterior of the container with plant material resident within the container capable of growing out through the top of the container, wherein the container is positionable below ground level surface, a separate collection chamber either fixed to or unattached from the container to receive stormwater initially flowing into said treatment system prior to transference to said container, and a primarily open bottomed compartment disposed below said container but in fluid communication with said container containing an organic or nonorganic aggregate material.

13. The stormwater treatment system of claim 12 including a drain pipe within said compartment, a portion of which maintains a plurality of holes to receive treated stormwater and so positioned to traverse portions of said system interior.

14. The stormwater treatment system of claim 13 including an outlet pipe communicating through an inlet pipe with said drain pipe.

15. The stormwater treatment system of claim 12 wherein the collection chamber is constructed of a woven or non-woven plastic or polymer-based material which is substantially permeable to water flow.

16. The stormwater treatment system of claim 12 wherein said separate collection chamber is positioned and located exterior of said treatment container while maintaining communication with said treatment container.

17. A stormwater treatment system for removing substances flowing into the system comprised of a treatment container having at least one side wall, a primarily open bottom wall, and at least partially open top and defining an interior containing a filter material that fills a substantial portion of said container, wherein the at least one side wall has an opening that allows filtered water to communicate with a subsurface area exterior of the container with plant material resident within the container capable of growing out through the top of the container, wherein the container is positionable below ground level surface, and a separate collection chamber either fixed to or unattached from the container to receive stormwater initially flowing into said treatment system prior to transference to said container.

18. The stormwater treatment system of claim 17 and a primarily open bottomed compartment disposed below said container but in fluid communication with said container containing an organic or nonorganic aggregate material.

19. The stormwater treatment system of claim 17 wherein said treatment container sidewall is constructed of an impermeable material.

20. The stormwater treatment system of claim 17 including a grate mounted on the top of the treatment container and having an opening for receiving the plant material.

21. The stormwater treatment system of claim 17 including an overflow pipe associated with the container.

22. The stormwater treatment system of claim 21 including a separate stormwater facility for receiving over flow from the overflow pipe.

* * * * *